United States Patent
Mikutel et al.

(10) Patent No.: US 10,339,372 B2
(45) Date of Patent: Jul. 2, 2019

(54) ANALOG STROKES TO DIGITAL INK STROKES

(71) Applicant: Microsoft Technology Licensing, LLC, Redmond, WA (US)

(72) Inventors: Ian Mikutel, Redmond, WA (US); Lisa C. Cherian, Woodinville, WA (US); Nassr Albahadly, Kirkland, WA (US); Gilles L. Peron, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 43 days.

(21) Appl. No.: 15/490,738

(22) Filed: Apr. 18, 2017

(65) Prior Publication Data
US 2018/0300541 A1    Oct. 18, 2018

(51) Int. Cl.
*G06K 9/00* (2006.01)
*G06K 9/62* (2006.01)

(52) U.S. Cl.
CPC ..... *G06K 9/00416* (2013.01); *G06K 9/00865* (2013.01); *G06K 9/6271* (2013.01); *G06K 2209/01* (2013.01)

(58) Field of Classification Search
CPC .... G06K 9/00865–00879; G06K 2209/01–03; G06K 9/72; G06K 9/00402–00436; G06K 9/6217; G06K 9/00416
USPC ............... 382/188, 185, 186, 181, 187, 189
See application file for complete search history.

(56) References Cited

U.S. PATENT DOCUMENTS

| | | | |
|---|---|---|---|
| 7,574,048 B2 | 8/2009 | Shilman et al. | |
| 8,594,387 B2 | 11/2013 | Kobeli et al. | |
| 8,751,550 B2 | 6/2014 | Vukosavljevic et al. | |
| 9,478,055 B2 | 10/2016 | Kang et al. | |
| 2003/0215142 A1* | 11/2003 | Gounares | G06F 3/0481 382/190 |

(Continued)

FOREIGN PATENT DOCUMENTS

WO    WO-2018084715 A1 * 5/2018

OTHER PUBLICATIONS

Doermann, David S., and Azriel Rosenfeld. "Recovery of temporal information from static images of handwriting." International Journal of Computer Vision 15.1-2 (1995): 143-164. (Year: 1995).*

(Continued)

*Primary Examiner* — Geoffrey E Summers
(74) *Attorney, Agent, or Firm* — Talem IP Law, LLP

(57) ABSTRACT

Analog written content of handwritten drawings or written characters can be transformed into digital ink via an analog-to-ink service. The analog-to-ink service can receive a static image of the analog written content, extract analog strokes from other information, such as background, in the static image, and then convert the analog strokes to digital ink strokes, for example, by populating an ink container with at least two parameters for defining the digital ink strokes. The at least two parameters can include a pressure, at tilt, a direction, a beginning point, an end point, a direction, a color, an order, an overlap, a language, and a time. The analog-to-ink service can provide the ink container to a content creation application that supports inking so that a user can manipulate the content in an inking environment.

19 Claims, 12 Drawing Sheets

(56) References Cited

U.S. PATENT DOCUMENTS

| | | | |
|---|---|---|---|
| 2004/0139391 A1* | 7/2004 | Stumbo | G06F 17/241 715/232 |
| 2006/0291727 A1* | 12/2006 | Bargeron | G06K 9/00442 382/218 |
| 2007/0172125 A1* | 7/2007 | Walch | G06K 9/00402 382/186 |
| 2008/0231429 A1 | 9/2008 | Leonard et al. | |
| 2016/0048318 A1* | 2/2016 | Markiewicz | G06F 3/04883 345/173 |

OTHER PUBLICATIONS

Doermann, David Scott. "Document image understanding: integrating recovery and interpretation." (1993). (Year: 1993).*

Williams, Rhiannon, "Moleskine Paper Tablet: Notebook to Make Your Handwriting Digital is Sketchy at Best", http://www.telegraph.co.uk/technology/2016/04/06/moleskine-paper-tablet-notebook-to-make-your-handwriting-digital/, Published on: Apr. 6, 2016, 20 pages.

"Evernote Notebooks by Moleskine", https://help.evernote.com/hc/en-us/articles/209126827, Retrieved on: Feb. 4, 2017, 5 pages.

"Bamboo Spark", http://www.wacom.com/en-de/products/smartpads/bamboo-spark, Retrieved on: Feb. 14, 2017, 16 pages.

Banerjee, et al., In Proceedings of 14th International Conference on Frontiers in Handwriting Recognition (ICFHR), Sep. 1, 2014, pp. 627-632.

Adam, Livescribe 3, http://www.appcessories.co.uk/best-smart-pens-immediate-analogue-to-digital/, Published on: May 15, 2016, 21 pages.

* cited by examiner

ANALOG STROKES TO DIGITAL INK STROKES

BACKGROUND

Content creation applications such as notebook applications, word processing applications, spreadsheet applications, and presentation applications are useful tools for generating and curating content. These and other content creation applications are increasingly including "inking" functionality that lets users input content and interact with the application (and content created therein) through using a pen or stylus (and sometimes fingers or other objects) in a manner evoking a pen on paper.

However, physical whiteboards, blackboards, and paper are common substrates for people to sketch or write ideas. Transferring sketches and notes from the "analog" world to the "digital" one where computers and software allow for curation, creation, and manipulation is challenging.

BRIEF SUMMARY

An analog stroke-to-digital ink stroke feature ("analog-to-ink feature") of (or for) a content creation application and an analog stroke-to-digital ink stroke service ("analog-to-ink service") are provided. The analog-to-ink feature of the content creation application and analog-to-ink service can enable users to transform analog written content to digital ink strokes that are themselves manipulatable in a digital "inking" environment.

The analog-to-ink service can receive a static image of written content. The written content may be a drawing (e.g., hand-drawn drawing of an object or graph) or written characters, such as letters, numbers, symbols, and punctuation. The written content can be considered to be formed of analog strokes—the continuous movement from contact to lifting of the handwriting instrument (e.g., pen, pencil, paint). A camera can be used to capture the static image of the written content. The camera brings the "analog' world into a digital format. However, a static image from a camera only transforms the scene to pixels and does not separate strokes from the whole entity captured. The analog-to-ink service thus extracts the analog strokes of the written content from the static image and converts the analog strokes to digital ink strokes. Once in the format of digital ink strokes, the originally analog written content can now be manipulated from within a content creation application as if, to the extent possible, the content was written with digital ink.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1A:
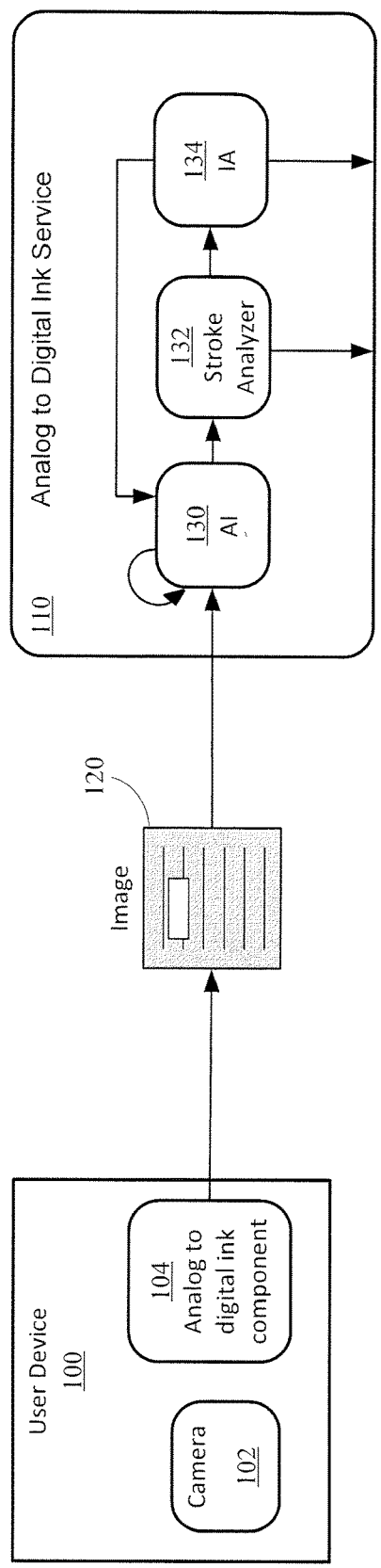
FIGS. 1A-1C illustrate example operating environments in which various embodiments of the invention may be carried out.

An analog stroke-to-digital ink stroke feature ("analog-to-ink feature") of a content creation application and an analog stroke-to-digital ink stroke service ("analog-to-ink service") are provided. The analog-to-ink feature of the content creation application and analog-to-ink service can enable users to transform analog written content to digital ink strokes.

Content creation applications are software applications in which users can contribute information to generate and curate content. The content creation applications that can incorporate the described features and services are directed to visual content where users can create text and/or image-based content in digital form. Example content creation applications include, but are not limited to, whiteboard applications, presentation applications, and notebook applications, phone applications, and web applications. The term "content creation application" may in some cases be synonymous with "content authoring application", "productivity application", or "content authoring tool". Since the described systems and techniques focus on applications and tools through which content is being created or authored, there is no distinction intended between these terms and such terms may be used interchangeably herein.

The described analog-to-ink feature is suitable for any content creation application that supports "inking" or "digital ink", which refers to the mode of user input where a stylus, mouse, or pen (or even user finger on a touch screen or pad) is used to capture handwriting in its natural form.

During typical inking capture, a digitizer generally provides a set of coordinates on a grid that can be used to convert an analog motion into discrete coordinate values. A digitizer may be laid under or over a screen or surface that can capture the movement of a finger, pen, or stylus (e.g., the handwriting or brush strokes of a user). Depending on the features of the digitizer, information such as pressure, speed of motion between points, and direction of motion can be collected.

An ink stroke refers to a set of properties and point data that a digitizer captures that represent the coordinates and properties of a "marking". It can be the set of data that is captured in a single pen down, up, or move sequence. The set of data can include parameters such as, but not limited to, a beginning of the stroke, an end of the stroke, the pressure of the stroke, the tilt (e.g., of the pen), the direction of the stroke, the thickness of a stroke, the time and timing of the stroke between discrete coordinates along the path of the stroke, and the color of the 'ink'.

A grouping of ink strokes that are identified as forming a drawn unit (e.g., word or drawing) can be considered stored within a data structure of an ink container. The ink container can include metadata associated with the word or drawing as a whole, as well as the ink stroke parameters for each ink stroke in the ink container.

With digital ink, a user can easily control the appearance of the inked word or inked drawing because of the data structure (and language) of the ink strokes, which involve the above referenced parameters (e.g., coordinates, pressure, direction, etc.). By being in the form of ink strokes, inked words, as well as inked drawings, are in an ink modifiable format.

In contrast to an inked drawing, which would be composed of ink strokes (and their associated parameters), objects such as shapes and images tend to have fewer parameters and are treated as single entities or have predefined, modifiable sub-components. Examples of such objects include, but are not limited to, clip art images, ready-made shapes (e.g., lines, basic shapes, arrows, flowcharts, etc.), and camera images. The term "static image" is used herein for the shapes and images (or other objects) that are treated as a whole and not of independently identifiable and modifiable elements. Although it can be possible to format and/or edit certain static images, the available editing tools and editable components (e.g., line, color, angle) may be limited.

The analog-to-ink service can receive a static image of written content. The written content may be a drawing (e.g., hand-drawn drawing of an object or graph) or written characters, such as letters, numbers, symbols, and punctuation. The written content can be considered to be formed of analog strokes. A camera can be used to capture the static image of the written content.

The analog-to-ink service can transform the analog written content captured by the static image into digital ink strokes. The analog-to-ink service can include an artificial intelligence component and a stroke analyzer component. The artificial intelligence component can extract the analog strokes of the written content from other parts of the static image. The stroke analyzer component can then convert the analog strokes to digital ink strokes. The stroke analyzer component creates the digital ink strokes by populating an ink container with at least two parameters for defining the digital ink strokes. The analog-to-ink service may then store the ink container in digital ink strokes data resource. In some cases, the analog-to-ink service further include an ink analyzer (locally or via an ink analyzer service) to perform ink analysis on the digital ink strokes created by the stroke analyzer component to identify additional parameters of the ink strokes, words or recognizable shapes from the ink strokes, or support other features that use recognized ink content.

The ink container and/or information identified by the ink analyzer can be provided to a content creation application so that a user can manipulate and/or perform further action on the transformed written content. The user can then interact with the transformed written content as if they had originally inked the content. The interactions can include, but are not limited to, modifying color or thickness of any of the ink strokes of the written content, adding or removing ink strokes, and annotating the written content.

The analog-to-ink feature of a content creation application can include or communicate with the analog-to-ink service to transform analog handwritten content (analog strokes) into digital ink strokes, which can then be manipulated from within the content creation application as if, to the extent possible, the content was written with digital ink.

Figure 1B:
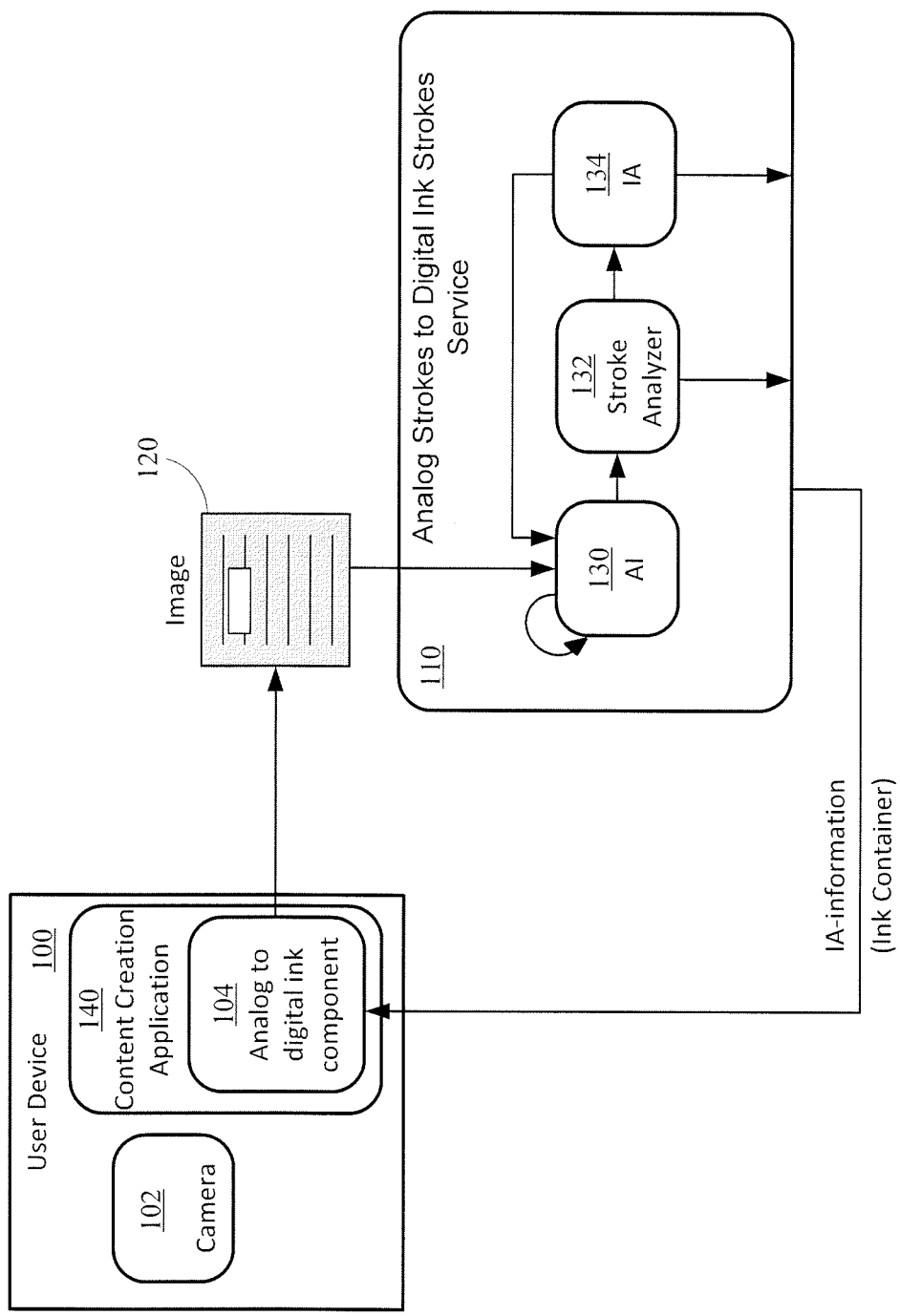
Figure 1C:
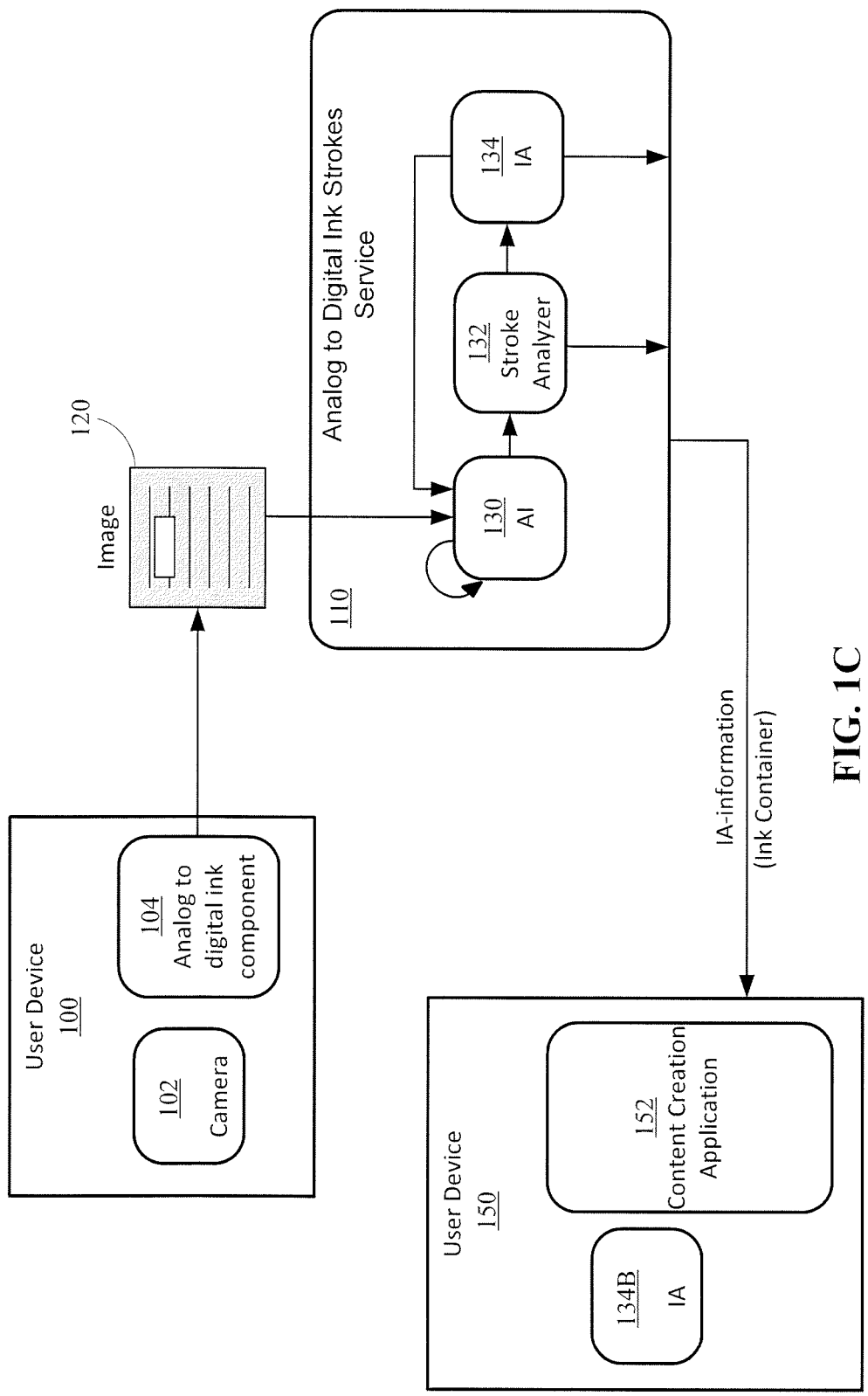
Figure 2:
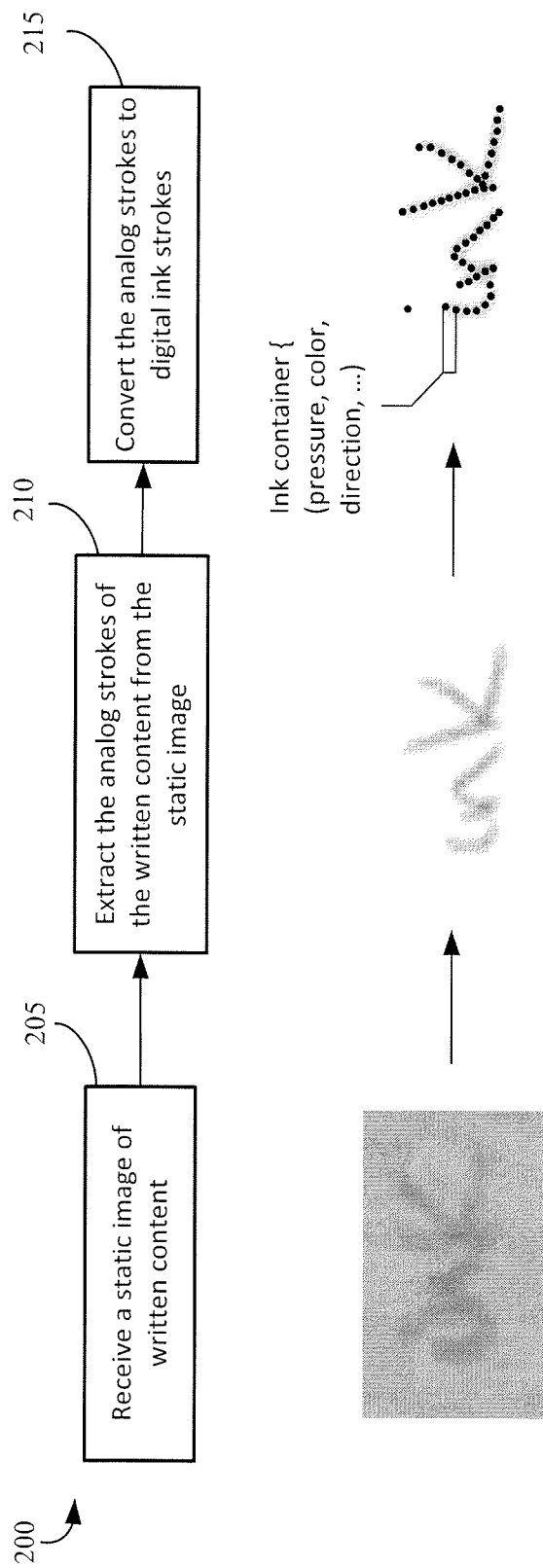
FIG. 2 illustrates an example process flow diagram of a method for transforming analog written content to digital ink strokes.

FIGS. 1A-1C illustrate example operating environments in which various embodiments of the invention may be carried out; and FIG. 2 illustrates an example process flow diagram of a method for transforming analog written content to digital ink strokes.

The example operating environments may include a user device 100, a camera 102, an analog stroke to digital ink stroke component (analog-to-ink component) 104, and an analog stroke to digital ink service (analog-to-ink service) 110. User device 100 may be a general-purpose device that has the ability to run one or more applications. The user device 100 may be, but is not limited to, a personal computer, a laptop computer, a desktop computer, a tablet computer, a reader, a mobile device, a personal digital assistant, a smart phone, a gaming device or console, a wearable computer, a wearable computer with an optical head-mounted display, computer watch, or a smart television.

Components (computing systems, storage resources, and the like) in the operating environment may operate on or in communication with each other over a network (not shown). The network can be, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as understood by those skilled in the art.

Communication to and from the components, such as from the analog-to-ink feature and the analog-to-ink service, may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

The camera 102 can be a still or video camera embodied, for example, as a digital camera with network connectivity and at least some processing and memory systems, a digital camera with wired or wireless connectivity to a computing system, or a camera of a phone or other mobile computing device.

The analog-to-ink component 104 can be a standalone application providing a portal to the analog-to-ink service 110 or an analog-to-ink feature of a content creation application to provide the functionality within the content creation application.

In response to receiving particular user interactions with the user device by a user of camera 102, the analog-to-ink component 104 may facilitate a call (or invocation) of the analog-to-ink service 110 using the API of the analog-to-ink service 110 so that the analog-to-ink service 110 may execute one or more operations to provide digital ink strokes, including those described with respect to FIG. 2. Analog-to-ink component 104 may also, in some cases, facilitate the presentation of the digital ink strokes, for example, by providing the digital ink strokes for input to a user interface of a content creation application (e.g., whiteboard application, notebook application, and the like).

Figure 6:
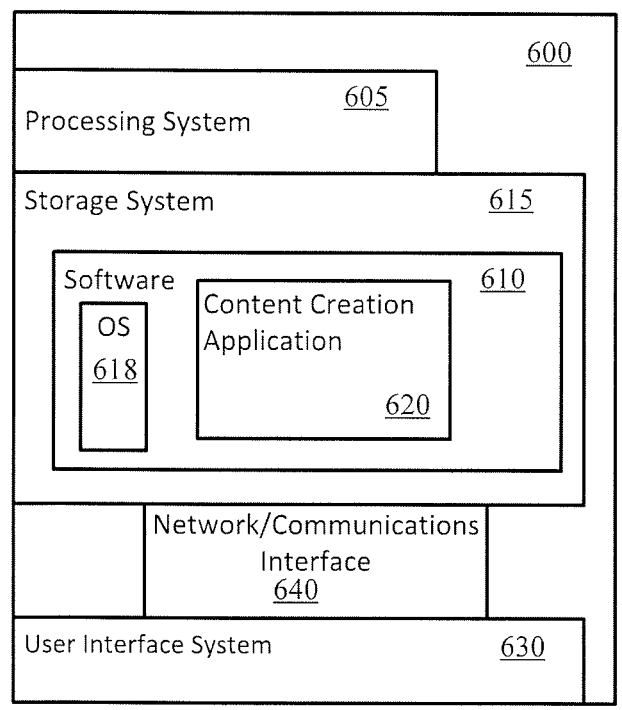
FIG. 6 illustrates components of a computing device that may be used in certain embodiments described herein.
Figure 7:
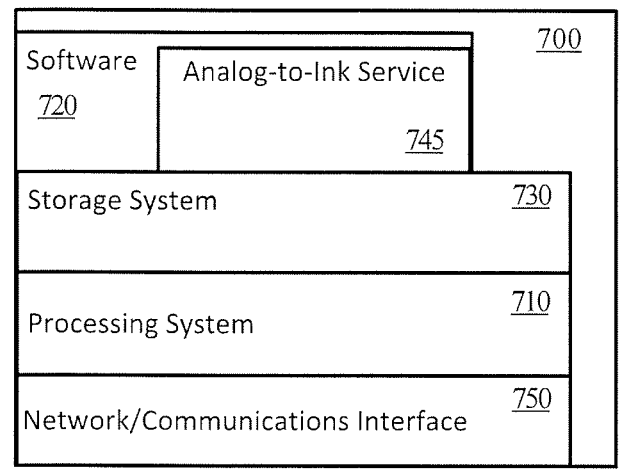
FIG. 7 illustrates components of a computing system that may be used to implement certain methods and services described herein.

Referring to both FIG. 1A and FIG. 2, the analog-to-ink service 110 performing process 200 described with respect to FIG. 2, can be implemented by a server (not shown), which can be embodied as described with respect to computing system 700 as shown in FIG. 7 and even, in whole or in part, by user device 100, which can be embodied as described with respect to computing system 600 shown in FIG. 6. The analog-to-ink service 110 can receive, via the analog-to-ink component 104, a static image 120 of written content (205). The written content may be written characters or a drawing and formed of analog strokes. The drawing may include, for example, a graph. The written characters may include letters, numbers, symbols, and punctuation (alone or in any combination). The written characters may form, for example, words, phrases, or scientific equations (e.g., a math equation, a chemistry equation, an economic equation). The static image 120 can be captured using the camera 102 of the user device 100. For example, the static image 120 may be an image of handwritten words on a white board, a hand drawn drawing on a piece of notebook paper, or handwritten words on a sticky note. In another example, the static image 120 may be a screenshot of a video captured by the camera 102. In some cases, the analog-to-ink service 110 may receive, via the analog-to-ink component 104, more than one static image 120 of written content.

The service 110 can then extract (210) the analog strokes of the written content from the static image; and then convert (215) the analog strokes to digital ink strokes. The analog-to-ink service 110 may process the received static image 120 and perform operations 210 and 215 via one or more components, shown in FIG. 1A as an artificial intelligence component (AI) 130, a stroke analyzer 132, and, optionally, an ink analyzer (IA) 134. For example, after receipt of the static image 120, the AI 130 may extract (210) the analog strokes of the written content from other information in the static image 120. Pre-processing of the static image 120 can be carried out before or by the AI 130 to create a cleaned-up version of the static image 120 by, for example, de-skewing the written content of the static image 120 or cleaning up the fuzziness of the static image 120. The AI 130 may determine what should be considered an analog stroke in the image versus what should be considered background. The AI 130 may extract, or separate, the written content from the background of the static image 120 or other marks that are not part of the written content (e.g., marks such as one of the lines on a ruled sheet of paper or stray or phantom marks on a board). The written content may be extracted (210) according to any number of processes any of which may be performed alone or in combination with the others.

For example, as one process, the AI 130 can extract the written content by performing a matching of the written content against examples of written characters and drawings stored in a matching data resource. In this case, the AI 130 can perform a matching exercise against each of the characters or symbols. For example, the AI 130 can determine that a written character forms a "K" because it matches most closely with the "K's" stored in the matching data resource. The AI 130 does not necessarily identify what the written characters say/mean or what the written drawing depicts. Instead, the AI 130 may only identify that there are analog strokes of written characters or a hand-drawn drawing in the static image 120. For example, it may not be necessary for the AI to determine that there is K verses an X, just that there are strokes that may be relevant to extract.

In another process, the AI 130 may apply an algorithm that can identify the edges of the pixels containing the written content in the static image 120. The AI 130 may then perform a trace operation along pixels identified as likely to be with content to create a new inked image containing only the analog strokes of the written content in a closest approximation of how a user could have drawn the strokes.

As another process, the AI 130 may computationally determine that a pixel in the static image 120 is part of the written content and then convert the pixel to a point in an inked image.

The AI 130 may be performed by any machine learning method known in the art. The AI 130 may include a training loop. Further, the AI 130 may be built by providing training to the AI 130 from the stroke analyzer 132 and/or the IA 134. It should be understood that although the AI 130 is shown as a single component, the AI 130 may be more than one component, a separate component, or included with another component, such as the stroke analyzer 132. Output of the AI 130 can be fed back to the AI 130 for refining and improving the extraction.

Other feedback mechanisms can be included, for example, from stroke analyzer 132 and IA 134 to further improve the extraction of pixels of the image that correspond to an analog stroke from the pixels containing other information. In some cases, the AI 130 may extract ink strokes of the written content. The IA 134 may then analyze the extracted ink strokes and provide possible alternative recognitions of the written content. The possible alternative recognitions may include a corresponding confidence level. The AI 130 can then use the information provided by the IA 134 to improve the ink strokes. For example, the AI 130 may try to match the possible alternative recognitions provided by the IA 134. Further, different loops may be executed to improve the results and the corresponding confidence level. A performance system may limit the number of loops executed.

The stroke analyzer 132 converts (215) the analog strokes to digital ink strokes. The converting from the analog strokes to the digital strokes includes populating an ink container with at least two parameters of a set of parameters for defining the digital ink strokes. The parameters may include, for example, one or more of a color, a pressure, a start location, an end location, a direction, a time, an overlap, an order, and a language. The stroke analyzer 132 may populate the parameters of the digital ink strokes a variety of ways. For example, the stroke analyzer 132 can use information determined by the AI 130 to help with populating the parameters of the digital ink strokes. The stroke analyzer 132 may then store the ink container with the populated parameters in a digital ink stroke data resource (not shown).

Artificial intelligence capabilities of the AI 130 (of a same of separate component) may be leveraged by the stroke analyzer 132 to extract characteristics of the strokes. For example, the AI 130 may be able to assign values regarding weight of a line (or segment of a line). These values or even categorization into "thick" and "thin" lines may be used by the stroke analyzer 132 to assign a pressure and/or direction to the analog stroke when converting the analog stroke to a digital ink stroke. That is, the stroke analyzer 132 may evaluate the width (e.g., thickness or thinness) of an analog ink stroke to determine a variety of parameters. In many cases, the beginning of an analog ink stroke may be wider than the end of the analog ink stroke. The stroke analyzer 132 may use the width of the analog ink stroke to determine the location where a user's pen started and the location where the user's pen ended. Once the stroke analyzer 132 determines the start location parameter and the end location parameter of the analog ink stroke, the stroke analyzer 132 may then be able to determine the direction parameter of the analog ink stroke. Additionally, the stroke analyzer 132 may use the width of the analog ink stroke to determine the pressure parameter of the analog ink stroke.

AI 130 may also be used determine the context of the written content. The AI 130 may include a classifier to determine a context property. For example, the AI 130 can determine that the written content is information about math or chemistry. The AI 130 may also be used to determine language (which may involve in some cases communication with or use of an ink analyzer). For example, the AI 130 may identify that the language of the strokes is Arabic and, therefore, can communicate to the stroke analyzer 132 that the strokes should be analyzed from right to left instead of left to right.

In another example, the AI 130 may use additional metadata associated with the static image 120 to improve determining the context. The additional metadata may include, for example, a geolocation parameter or a time parameter. The geolocation parameter may be used with a search service, such as Microsoft Bing®, to obtain additional context, such as if the static image 120 was taken at work, at school, or at home. A more detailed discussion of the using the time parameter will be provided herein.

The stroke analyzer 132 may use the language information to determine the order parameter. For example, the AI 130 may determine the language of the written characters. Once the stroke analyzer 132 knows the language parameter, the stroke analyzer 132 can determine the order of the written content. For example, if the language parameter is English, then the stroke analyzer 132 can understand the stroke analysis should be performed from left to right. If the language parameter is Arabic, then the stroke analyzer 132 can understand the stroke analysis should be performed from right to left.

Of course, the identified language of the written characters can be used by the stroke analyzer 132 to populate a language parameter in an ink container of the digital ink stroke.

In another example, the AI 130 can identify colors for the analog ink strokes. The AI's determining of the color of the written content be used by the stroke analyzer 132 populate a color parameter in the ink container of the digital ink stroke. Of course, in some cases, the stroke analyzer 132 can directly determine the color of the analog strokes.

The stroke analyzer 132 may determine the overlap parameter by receiving information from the AI 130. The information may include information informing the stroke analyzer 132 that the character contains two strokes and a what character matches the character when performing a match against the matching data resource. In cases where AI 130 is used to group related analog strokes, for example by using context information, the AI 130 can facilitate the determination of overlap information. One example of grouping may include grouping potentially overlapping analog strokes. When a user draws the letter "X", the lines intersect and overlap each other. However, when the letter "X" is captured in a static image, it is difficult to determine that there is one analog stroke on top of another analog stroke. There is no information or parameters included to understand that the lines intersect and overlap each other because the only information included is what is visually presented. The AI 130 can be used to determine that these two overlapping lines are related and thus group them together for the stroke analyzer 132.

Additionally, the AI 130 may be able to detect a sub property, such as overlapping strokes. The overlapping strokes may indicate, for example, a strike through or a highlight. The overlapping strokes sub property may then be used when identifying the context of the written content.

Determining the time of the written content can help the stroke analyzer 132 populate the time parameter in the ink container of the digital ink stroke. The stroke analyzer 132 may determine the time parameter by using successive static images (and their timestamps) that may have been captured during the actual writing of the analog written content. In addition, the AI 130 may also be able to use the timing parameter to help determine whether to group the analog strokes. For example, the AI 130 may use a time parameter to help determine whether to group the analog strokes. If a user writes some content at nine o'clock in the morning and then writes more content at one o'clock the next afternoon, the AI 130 may determine that these two contents are not closely related. Further, the AI 130 may use the time parameter in association with a calendar of the user. The AI 130 may be able to determine that the static image 120 was taken during a math class or a cooking class. Additionally, using the time parameter in association with the calendar of the user, the AI 130 may determine that the written content may have been written during a meeting the user attended.

In another example, the AI 130 may also use a color parameter to help determine whether to group the analog strokes. If a user writes characters in black ink and then draws a picture in red, the AI 130 may determine that the black analog strokes should be grouped together and the red analog strokes should be grouped together.

Further, the AI 130 can also use analog semantic information that is not just about the analog stroke itself to group the written content. The semantic information can be beneficial because the written content of static image 120 may only be a drawing, such as a doodle, that does not include any characters. For example, if a user takes a picture of written content on an analog sticky note, the AI 130 can infer that, because all the analog strokes are on a background of the same color or shape, they are grouped together. The AI 130 can communicate to the stroke analyzer 132 that these analog strokes should be grouped together when converted.

Additionally, if a user takes a picture of multiple sticky notes (e.g., yellow sticky notes including written text for a first topic and red sticky notes including written text for a second topic), the AI 130 may be able to determine that all the analog strokes on the yellow sticky notes should be grouped together and all the analog strokes on the red sticky notes should be grouped together.

After the analog strokes of the extracted content has been converted to digital ink strokes (215), the analog-to-ink ink service 110 (or a content creation application) may further run an IA 134 to perform ink analysis on the digital ink strokes. The ink analysis can identify words and other information from the digital ink strokes. For example, the IA 134 may recognize a word from the written characters and return a text-based version of the written characters. In another example, the IA 134 may identify what the drawing depicts and send the analog-to-ink component 104 tags associated with the drawing.

Although shown as three separate components in the drawing, this representation is conceptual rather than physical and the instructions and/or circuitry may be configured in any suitable manner to carry out the functions. In addition, ink analysis features may be omitted from the analog-to-ink service.

Referring to FIG. 1B, the analog-to-ink component 104 may be a feature of a content creation application 140. In this example, a user may capture a static image 120 of written content through the camera 102 and save the static image 120 in a user device storage (not shown) (e.g., as part of a camera roll). The user may, through the content creation application 140 (and permissions granted by user and via the operating system), access the user device storage to retrieve the static image 120.

The analog-to-ink service 110 can receive, via the analog-to-ink component 104, the static image 120 of written content. The written content may be written characters or drawings. As previously discussed, upon receipt of the static image 120, the AI 130 may extract the analog strokes of the written content from background in the static image 120. The stroke analyzer 132 may then convert the analog strokes to digital ink strokes by populating an ink container with at least two parameters for defining the digital ink strokes. The analog-to-ink service 110 may, in some cases, store the ink container with the populated parameters in a digital ink stroke data resource associated with the user (not shown).

In some cases, the analog-to-ink service 110 provides the digital ink strokes in the form of the ink container to the analog-to-ink component 104 in the content creation application 140. Since the written content has been transformed to digital ink strokes, the user may edit the digital ink strokes. For example, the user may modify the digital ink strokes by changing the color of the ink strokes, changing the thickness of the digital ink strokes, changing the size of the digital ink strokes, rotating the ink strokes, adding additional digital ink strokes, and removing digital ink strokes. The user may also locally run an ink analysis on the digital ink strokes.

In some cases, the analog-to-ink service 110 perform ink analysis, using the IA 134, on the digital ink strokes and provide the resulting information to the content creation application 140 along with the ink container so that words (e.g., a text-based version of the written content) and other information (e.g., language determination, structured data, entity determination, metadata, tags) can be provided to the user.

Referring to FIG. 1C, the operating environment can include one device (user device 100) that captures the static image 120 and communicates the static image to the analog-to-ink service 110 via the analog-to-ink component 104; and a second device (user device 150) that has a content creation application 152 that includes inking capabilities (and may include an ink analyzer component 134B) and that can receive the transformed written content originally captured by the camera 102 of user device 100. Content creation application 152 may or may not also include its own analog-to-ink component.

The analog-to-ink service 110 can receive, via the analog-to-ink component 104 at user device 100, the static image 120 of analog written content. The written content may be written characters or drawing and formed of analog ink. As previously discussed, upon receipt of the static image 120, the analog-to-ink service 110 can perform process 200. For example, the AI 130 may extract the analog strokes of the written content from other information of the static image 120. The stroke analyzer 132 may then convert the analog strokes to digital ink strokes by populating an ink container with at least two parameters for defining the digital ink strokes. The ink container can be provided to the content creation application 152 as is or with additional information generated by the ink analyzer 134 that may optionally be part of the service 110. The analog-to-ink service 110 may store the ink container with the populated parameters in a digital ink stroke data resource associated with a user (not shown) such that the ink container can be accessed by the user at user device 150 (or even by user at user device 100) and displayed in the content creation application 152. The user may then, through the content creation application 152 on a same or a second user device 150, request the transformed written content (e.g., the ink container) from the analog-to-ink service 110.

Since the written content has been transformed to digital ink strokes, the user may edit the written content. The user may invoke an ink analysis component 134B on the digital ink strokes to carry out certain features of the inking capabilities of the content creation application 152.

Figure 3:
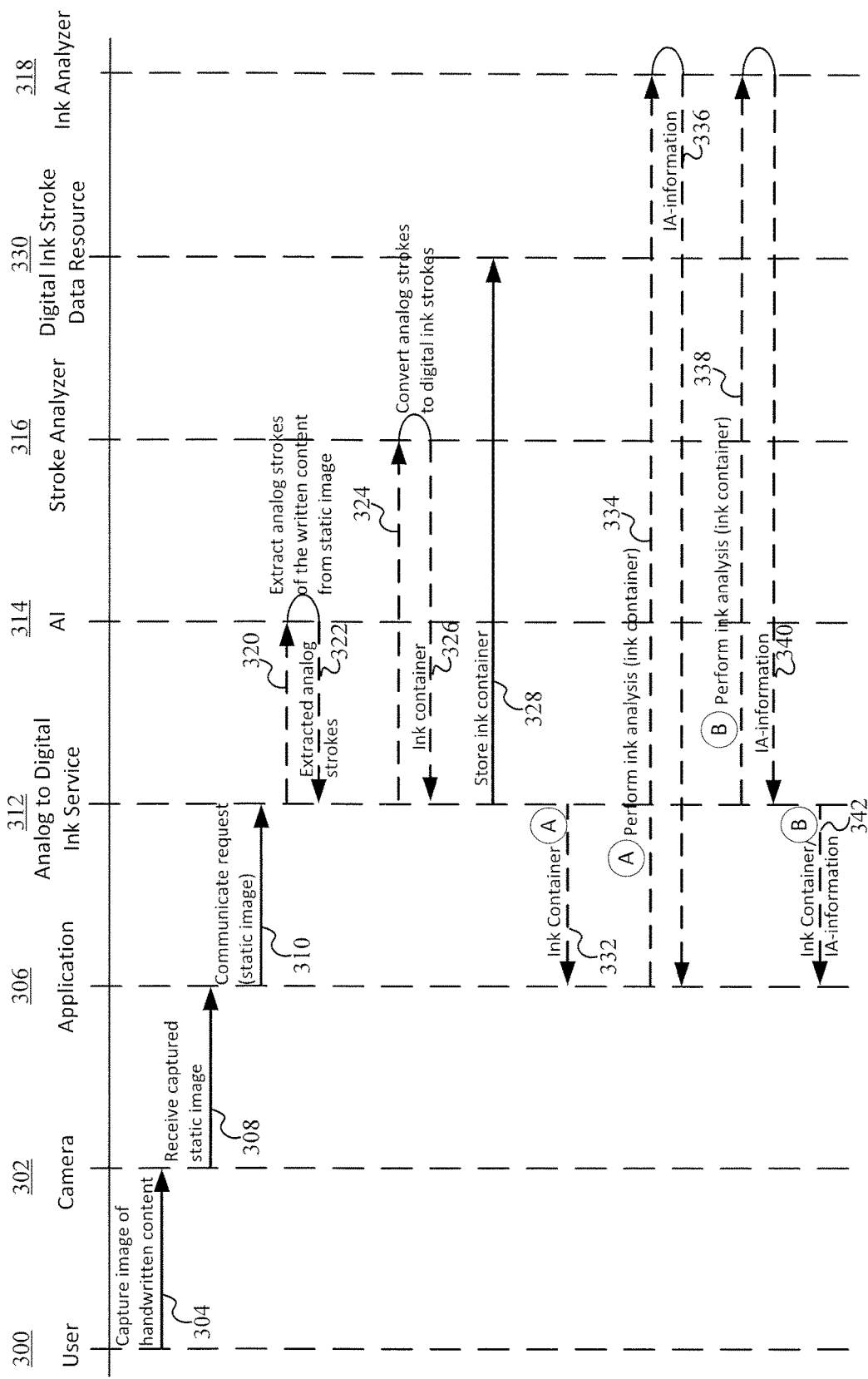
FIG. 3 illustrates a sequence diagram with an example process flow.

FIG. 3 illustrates a sequence diagram with an example process flow. Referring to FIG. 3, the sequence flow can begin when a user 300 interacts with a camera 302 to capture a static image of handwritten content (304). To capture the static image of the handwritten content (304), the user 300 may capture the handwritten content by taking a photograph using the camera 302 or taking a video of the user writing using the camera 302 and selecting one or more screenshots of the handwritten content. A content creation application 306 may receive the captured static image (308). The application 306 may receive the image directly (via use of a camera on the user's device) or from a storage resource (local or remote to the device). The application 306 can be a stand-alone analog-to-ink application or a content creation application including an analog-to-ink feature. The application 306 can communicate a request (310) to an analog-to-ink service 312 to perform the conversion from analog written content to digital ink strokes. The request can include the captured static image.

The analog-to-ink service 312 may process the received static image 120 via one or more functional components, such as AI 314, a stroke analyzer 316, and IA 318. For example, the AI 314 can extract the analog strokes of the written content from other information of the static image (320). The AI 314 can operate according to any of the methods described with respect to AI 130. With the extracted analog strokes (322), the analog-to-ink service 312 may run the stroke analyzer 316 to convert the analog strokes to digital ink strokes (324). The stroke analyzer 316 converts the analog strokes to digital ink strokes by populating an ink container with at least two parameters for defining the digital ink strokes by any of the previously discussed methods. The stroke analyzer 316 may return an ink container with the populated parameters (326). The analog-to-ink service 110 may then store the ink container with the populated parameters (328) in a digital ink stroke data resource 330.

In case A, the IA 318 is included in the content creation application 302 (or as part of an IA service that the content creation application 302 calls). In case B, the IA 318 is included in (or an IA service called by) the analog-to-ink service 312.

In case A, the analog-to-ink service 312 may return the ink container (332) to the application 306. As previously discussed, since the written content has been transformed to digital ink strokes, the user 300 may modify the digital ink strokes. The application 302 may run the IA 318 to perform ink analysis (334) on the digital ink strokes. The IA 318 may then provide the application 306 with words and other information (336).

In case B, the analog-to-ink service 312 can run the IA 318 to perform ink analysis (338) on the digital ink strokes. The IA 318 can return words (e.g., a text-based version of the written word or identified grouping of digital ink strokes)

(340) to the analog-to-ink service 312. The analog-to-ink service 312 can provide the application 306 with the words and other information, along with the digital ink strokes in the form of an ink container (342).

Figure 4A:
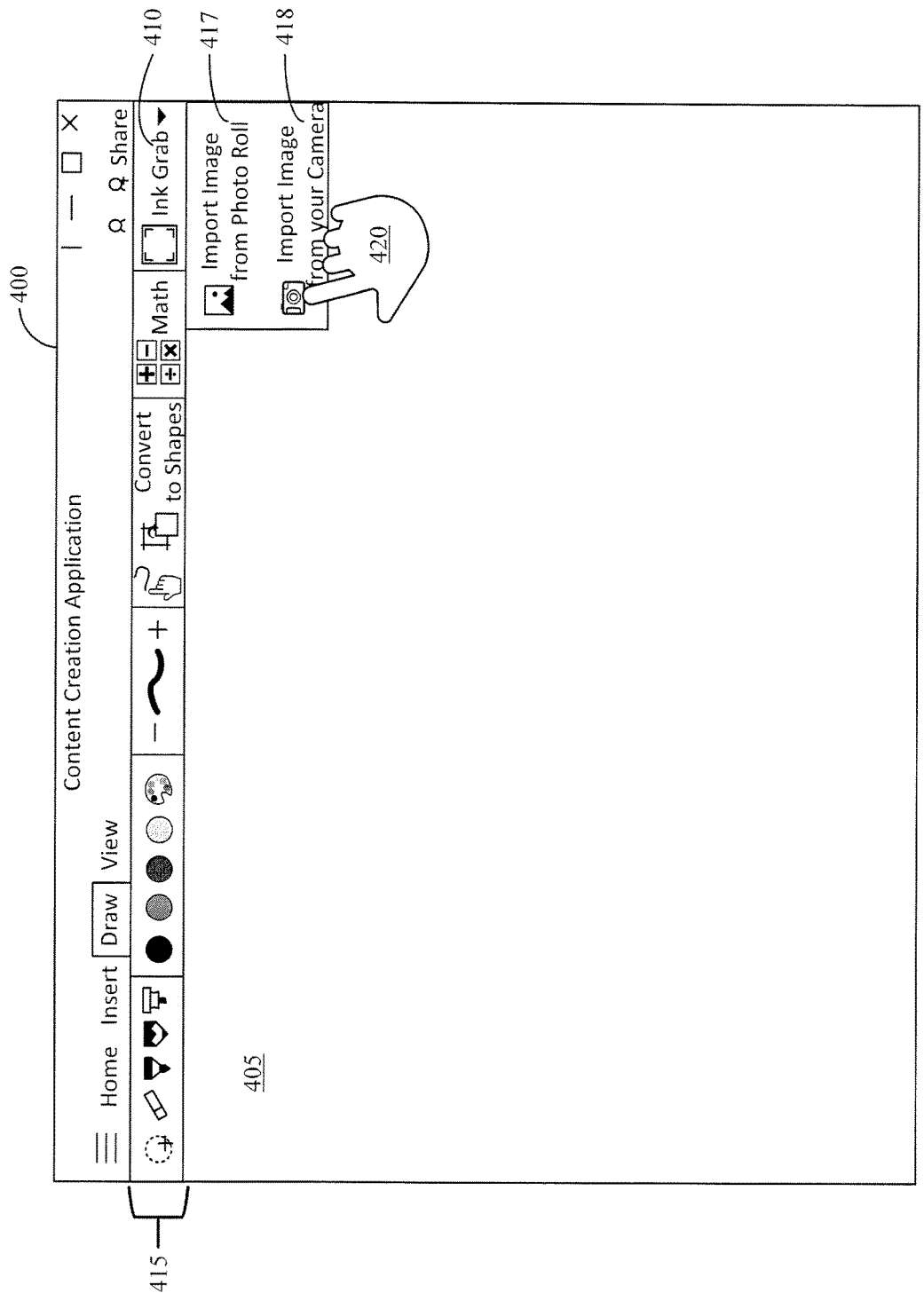
FIGS. 4A-4D illustrate example scenarios of transforming analog written content to digital ink strokes.
Figure 4B:
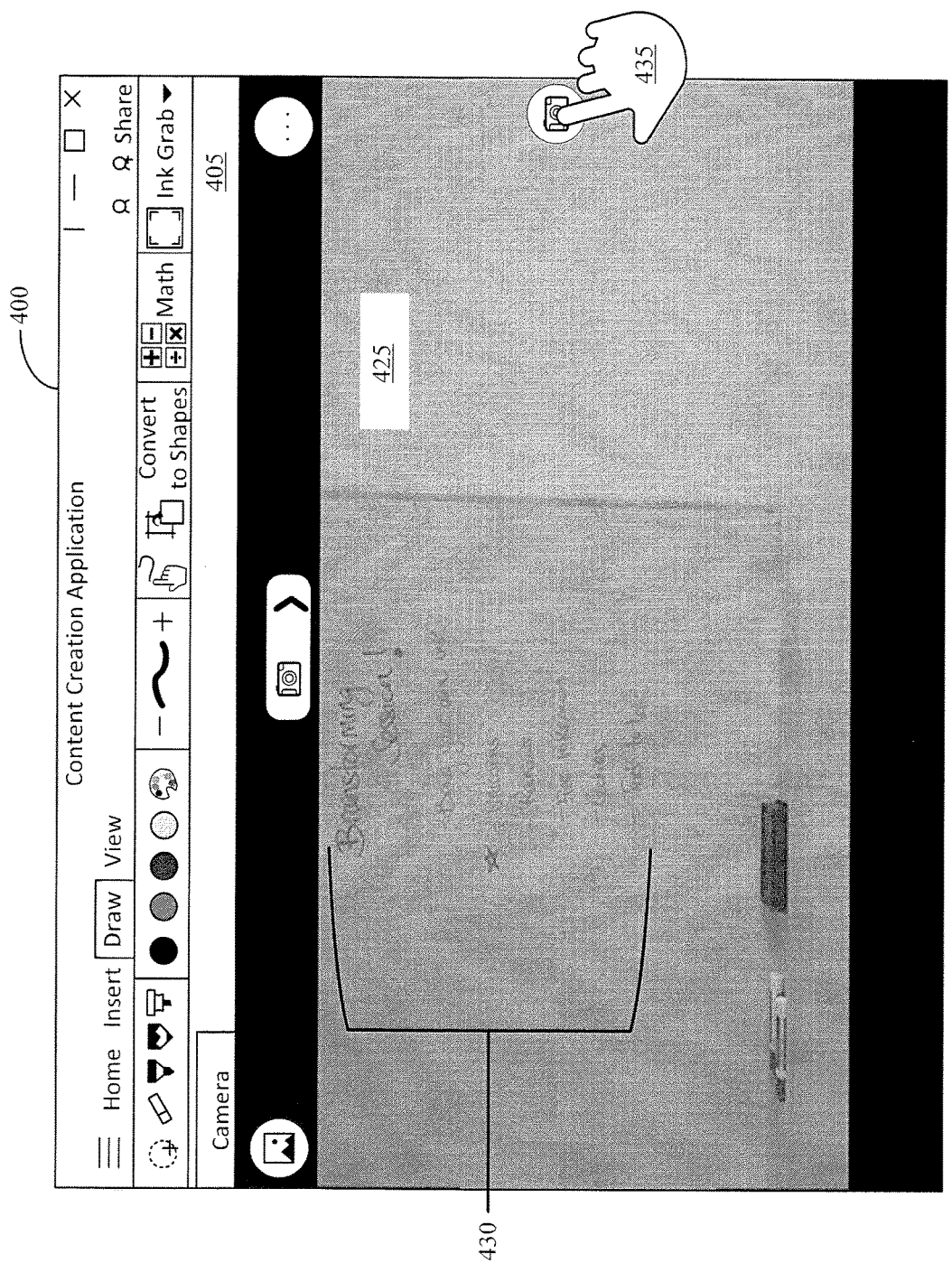
Figure 4C:
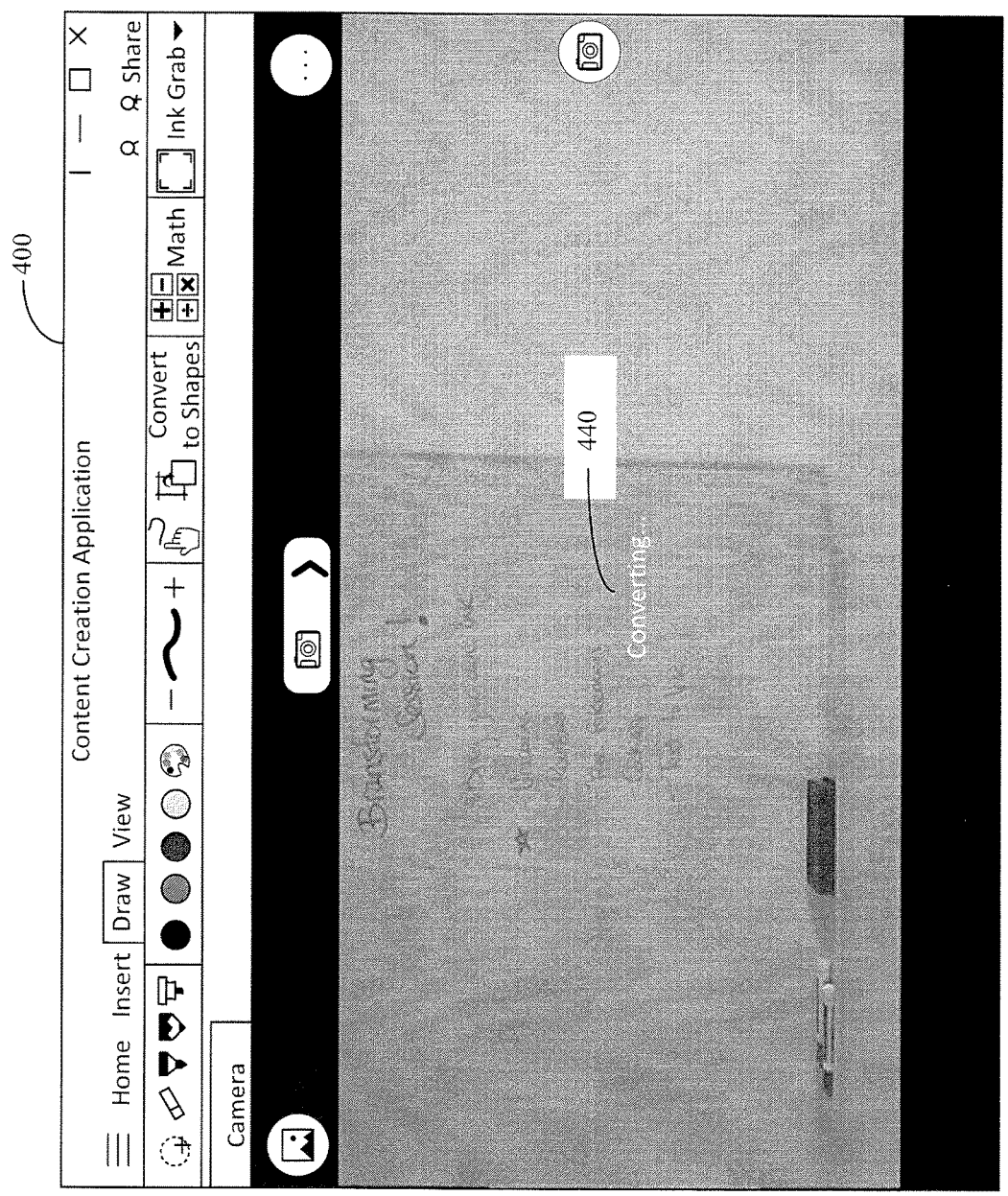
Figure 4D:
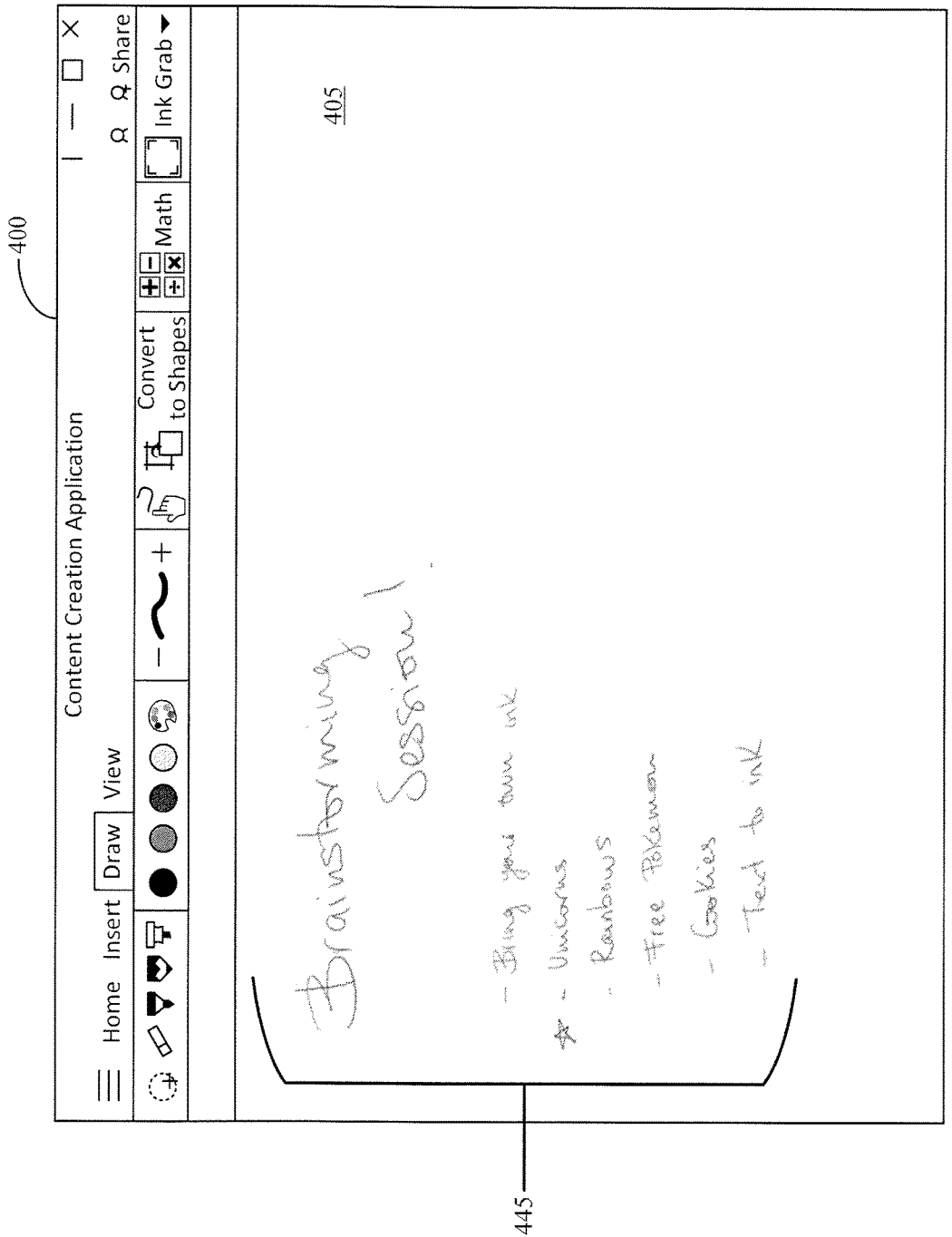
Figure 5A:
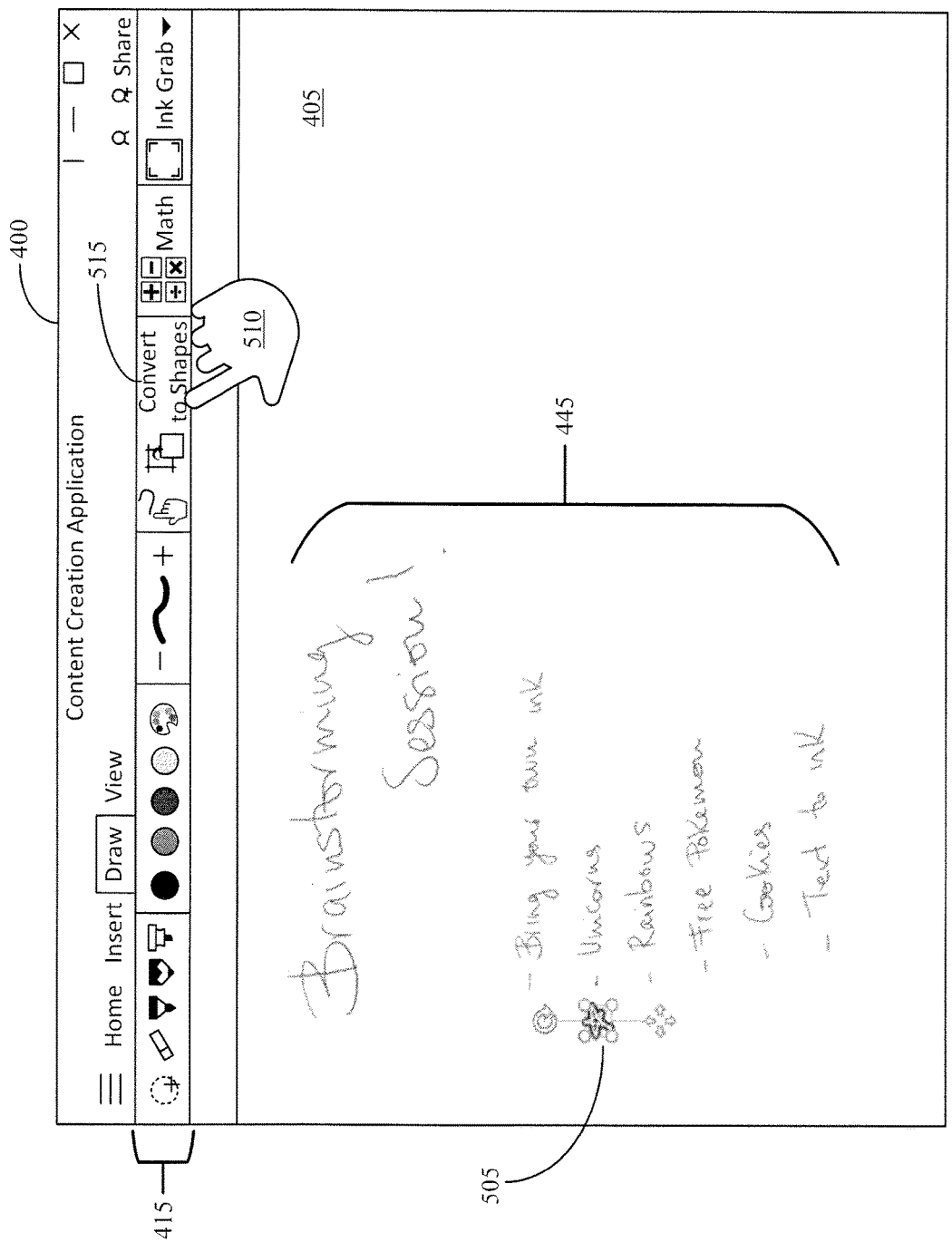
FIGS. 5A and 5B illustrate example scenarios of manipulating digital ink strokes that were generated by the analog-to-ink service.
Figure 5B:
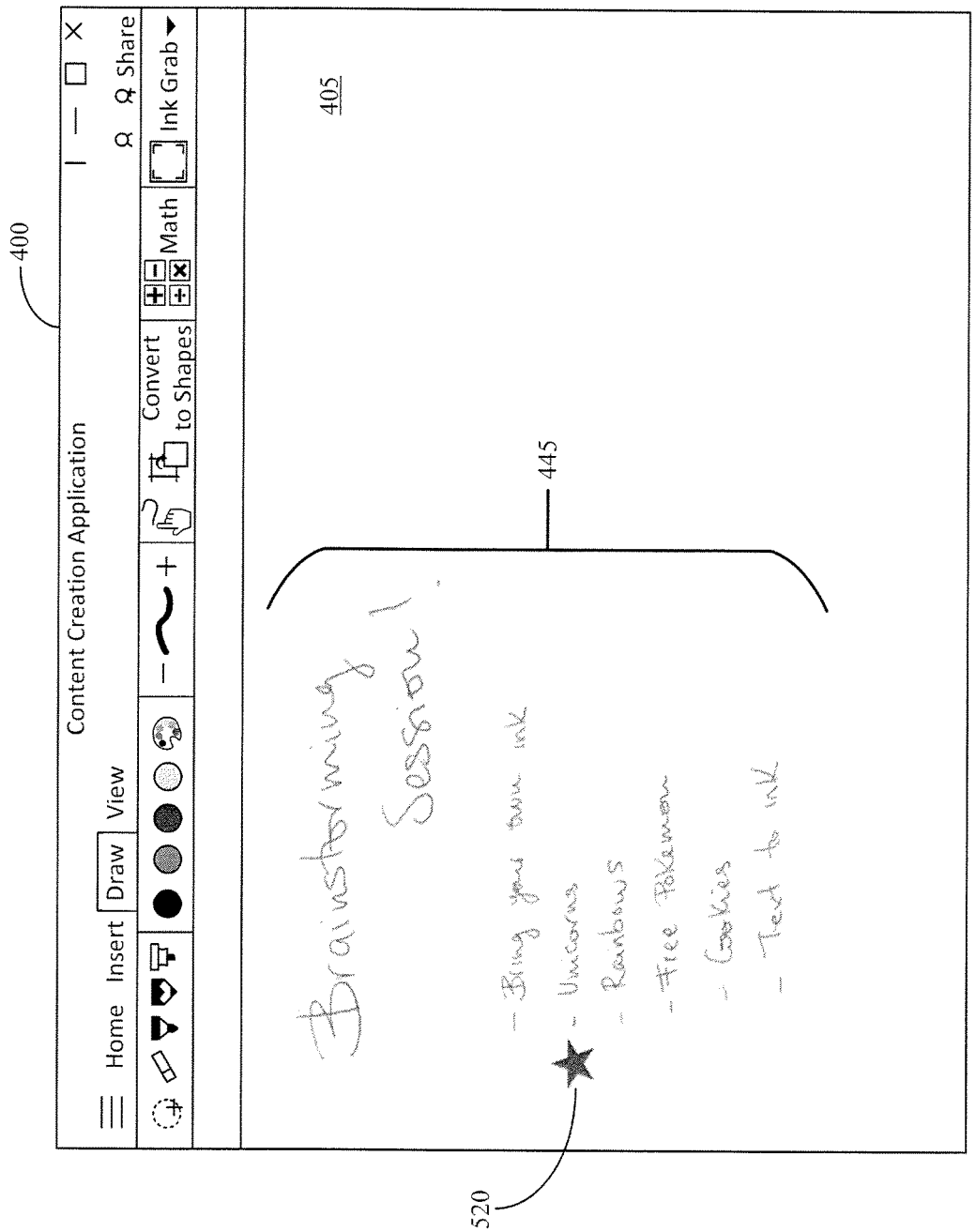

FIGS. 4A-4D illustrate example scenarios of transforming analog written content to digital ink strokes; and FIGS. 5A and 5B illustrate example scenarios of manipulating digital ink strokes that were generated by the analog-to-ink service.

Referring to FIG. 4A, a user may open a canvas interface 405 of a content creation application 400 on their computing device (embodied, for example, as system 600 described with respect to FIG. 6). The computing device can be any computing device such as, but not limited to, a laptop computer, a desktop computer, a tablet, a personal digital assistant, a smart phone, a smart television, a gaming console, wearable device, and the like.

The user may import a static image onto the canvas interface 405 of the content creation application 400. The static image may include written content, such as written characters or drawings. The static image may be captured using a camera and imported from the camera or a storage, such as a photo roll. An analog-to-ink ink feature icon or menu 410 may be include in the toolbar 415 of the content creation application 400. The user may select the analog-to-ink feature icon or menu 410 to command the application to transform a static image of analog strokes to digital ink strokes. The user may select a photo roll command 417 to import the static image from photo roll or a camera command 418 to capture the static image from camera. In this example, the user selects (420) the camera command 418 to capture the static image from a camera. It should be understood that in some cases, the user may import more than one static image or a group of successive static images. Referring to FIG. 4B, while the camera interface 425 is displayed on the canvas interface 405 of the content creation application 400, the user may select (435) to capture written content 430 drawn on a whiteboard. For example, a user may work with a group of users during a brainstorming session. The user may have written the information from the brainstorming session on a whiteboard. In the example of FIG. 4B, the user has written a list for the "Brainstorming Session!" with items including "Bring your own ink", "Unicorns" (with a star drawn next to the item), "Rainbows", "Free Pokémon", "Cookies", and "Text to ink".

Referring to FIG. 4C, upon selecting (435) to capture the written content (or alternatively in response to a second selection to proceed with conversion), the content creation application 400 communicates with an analog-to-ink service to transform the written content to digital ink strokes according to any of the methods described with respect to the service 110. The illustrated interface shows a message 440, "Converting . . . ", that can signal to the user that the written content in the static image is being transformed to digital ink.

Referring to FIG. 4D, when the transforming process is complete, the transformed written content 445 is displayed as digital ink strokes in the canvas interface 405 of the content creation application 400. Advantageously, the transformed written content 445 inserted into the canvas interface 405 is of a modifiable format (as opposed to a static image). Since the transformed written content 445 has digital ink strokes, once the transformed written content 445 is inserted into the canvas interface 405 of the content creation application 400, the user can interact with the transformed written content 445 as if the user had drawn the transformed written content 445 as digital ink strokes themselves. The user may modify the transformed written content 445 by, for example, annotating the digital ink strokes, adding ink strokes, removing ink strokes, or changing parameters of the digital ink strokes, such as color or thickness. Indeed, the digital ink strokes may be edited as if the user had created them themselves. Advantageously, the conversion of analog strokes to digital ink strokes allows the user to capture handwritten content in a modifiable format.

One example of functionality that can be applied once analog written content is transformed to digital ink strokes is illustrated in FIGS. 5A and 5B. Referring to FIG. 5A, functionality such as converting ink to shapes can be applied to the now-in-digital-ink-stroke content. In the example of FIG. 5A, the transformed written content 445 includes a hand drawn star 505. The user can select (510) to convert digital ink strokes of the hand drawn star 505 to a shape through a convert to shapes feature icon 515 on the toolbar 415 of the content creation application 400, which initiates a capability supported by an ink analysis component of the application.

Referring to FIG. 5B, a picture of a star 520 may be inserted in place of the hand drawn star 505 (as shown in FIG. 5A) in the transformed written content 445 in the canvas interface 405 of the content creation application 400. The modifications to the transformed written content 445 can be saved by the content creation application 400. Additionally, ink analysis may be performed on the transformed written content, for example, to detect shapes, tables, flowcharts, scientific information (e.g. math information or chemistry information), music, and the like.

FIG. 6 illustrates components of a computing device that may be used in certain embodiments described herein; and FIG. 7 illustrates components of a computing system that may be used to implement certain methods and services described herein.

Referring to FIG. 6, system 600 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 600 may be incorporated to implement a particular computing device.

System 600 includes a processing system 605 of one or more processors to transform or manipulate data according to the instructions of software 610 stored on a storage system 615. Examples of processors of the processing system 605 include general purpose central processing units, application specific processors, and logic devices, as well as any other type of processing device, combinations, or variations thereof. The processing system 605 may be, or is included in, a system-on-chip (SoC) along with one or more other components such as network connectivity components, sensors, video display components.

The software 610 can include an operating system 618 and application programs such as a content creation application 620 that calls the analog-to-ink service as described herein. Device operating systems 618 generally control and coordinate the functions of the various components in the computing device, providing an easier way for applications to connect with lower level interfaces like the networking interface.

Storage system 615 may comprise any computer readable storage media readable by the processing system 605 and capable of storing software 610 including the content creation application 620.

Storage system 615 may include volatile and nonvolatile memories, removable and non-removable media implemented in any method or technology for storage of information, such as computer readable instructions, data structures, program modules, or other data. Examples of storage media of storage system 615 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal.

Storage system 615 may be implemented as a single storage device but may also be implemented across multiple storage devices or sub-systems co-located or distributed relative to each other. Storage system 615 may include additional elements, such as a controller, capable of communicating with processing system 605.

Software 610 may be implemented in program instructions and among other functions may, when executed by system 600 in general or processing system 605 in particular, direct system 600 or the one or more processors of processing system 605 to operate as described herein.

The system can further include user interface system 630, which may include input/output (I/O) devices and components that enable communication between a user and the system 600. User interface system 630 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input. At a minimum, the user interface system 630 supports inking. For example, the user interface system 630 can include a touch-sensitive display or digitizing pen.

The user interface system 630 may also include output devices such as display screen(s), speakers, haptic devices for tactile feedback, and other types of output devices. In certain cases, the input and output devices may be combined in a single device, such as a touchscreen, or touch-sensitive, display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display (not shown) in myriad ways, presenting graphical user interface elements, text, images, video, notifications, virtual buttons, virtual keyboards, or any other type of information capable of being depicted in visual form.

The user interface system 630 may also include user interface software and associated software (e.g., for graphics chips and input devices) executed by the OS in support of the various user input and output devices. The associated software assists the OS in communicating user interface hardware events to application programs using defined mechanisms. The user interface system 630 including user interface software may support a graphical user interface, a natural user interface, or any other type of user interface. For example, the canvas interfaces for the content creation application 620 described herein may be presented through user interface system 630.

Network interface 640 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Certain aspects described herein, such as those carried out by the analog-to-ink service described herein may be performed on a system such as shown in FIG. 7. Referring to FIG. 7, system 700 may be implemented within a single computing device or distributed across multiple computing devices or sub-systems that cooperate in executing program instructions. The system 700 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 700 can include a processing system 710, which may include one or more processors and/or other circuitry that retrieves and executes software 720 from storage system 730. Processing system 710 may be implemented within a single processing device but may also be distributed across multiple processing devices or sub-systems that cooperate in executing program instructions.

Storage system(s) 730 can include any computer readable storage media readable by processing system 710 and capable of storing software 720. Storage system 730 may be implemented as a single storage device but may also be implemented across multiple storage devices or sub-systems co-located or distributed relative to each other. Storage system 730 may include additional elements, such as a controller, capable of communicating with processing system 710.

Software 720, including analog-to-ink service 745, may be implemented in program instructions and among other functions may, when executed by system 700 in general or processing system 710 in particular, direct the system 700 or processing system 710 to operate as described herein for the analog-to-ink service (and its various components and functionality).

System 700 may represent any computing system on which software 720 may be staged and from where software 720 may be distributed, transported, downloaded, or otherwise provided to yet another computing system for deployment and execution, or yet additional distribution.

In embodiments where the system 700 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A network/communication interface 750 may be included, providing communication connections and devices that allow for communication between system 700 and other computing systems (not shown) over a communication network or collection of networks (not shown) or the air.

Certain techniques set forth herein with respect to the content creation application and/or analog-to-ink service may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory propagating signals.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method, executed by a hardware processor, for transforming analog written content to digital ink strokes, comprising:
   receiving a static image of written content captured by a camera;
   extracting, from the static image, analog strokes of the written content from background information of the static image and marks that are not part of the written content;
   analyzing the analog strokes to identify at least two ink parameters associated with an underlying analog stroke of the written content;
   converting the analog strokes to an ink modifiable format of digital ink strokes comprising the at least two ink parameters;
   storing the digital ink strokes;
   displaying the digital ink strokes separate from the background information of the static image and the marks that are not part of the written content;
   receiving a modification to at least one of the digital ink strokes; and
   displaying the digital ink strokes with the modification to the at least one of the digital ink strokes.

2. The method of claim 1, wherein the written content comprises written characters, wherein the written characters comprise letters, numbers, symbols, punctuation, or a combination thereof.

3. The method of claim 1, wherein converting the analog strokes to the ink modifiable format of digital ink strokes comprises populating an ink container with the at least two ink parameters, wherein the at least two ink parameters are selected from a set of parameters consisting of a pressure, a direction, a beginning point, an end point, a color, an order, an overlap, a language, and a time.

4. The method of claim 1, wherein analyzing the analog strokes comprises:
   determining a pressure parameter, wherein determining the pressure parameter comprises determining a line thickness between two points along an analog stroke extracted from the static image.

5. The method of claim 1, wherein analyzing the analog strokes comprises:
   determining a direction parameter, wherein determining the direction parameter comprises determining a line thickness between two points along an analog stroke extracted from the static image.

6. The method of claim 1, further comprising performing an ink analysis on the digital ink strokes to identify at least one word.

7. The method of claim 1, further comprising:
   providing an intermediate digital stroke conversion of the analog strokes for ink analysis;
   receiving results of the ink analysis, the results comprising possible alternative recognitions of the written content; and
   applying the received results of the ink analysis in the extracting of the analog strokes of the written content to refine the conversion of the analog strokes.

8. A system comprising:
   a processing system;
   one or more storage media;
   a display; and
   a content creation application with an analog-to-ink feature stored on at least one of the one or more storage media, that when executed by a hardware processor of the processing system, directs the processing system to:
     receive a static image of written content captured by a camera;
     extract, from the static image, analog strokes of the written content from background information of the static image and marks that are not part of the written content of the static image;

analyze the analog strokes to identify at least two ink parameters associated with an underlying analog stroke of the written content;

convert the analog strokes to an ink modifiable format of digital ink strokes comprising the at least two ink parameters;

store the digital ink strokes;

display the digital ink strokes in the display separate from the background information of the static image and the marks that are not part of the written content of the static image;

receive a modification to at least one of the digital ink strokes; and update the display to reflect the modification to the at least one of the digital ink strokes.

9. The system of claim 8, wherein the written content comprises a drawing or written characters.

10. The system of claim 8, wherein the at least two ink parameters are selected from a set of parameters consisting of a pressure, a direction, a beginning point, an end point, a color, an order, an overlap, a language, and a time.

11. The system of claim 8, wherein instructions to convert the analog strokes to the ink modifiable format of digital ink strokes direct the processing system to:

determine a line thickness between two points along an analog stroke extracted from the static image.

12. The system of claim 11, wherein the at least two ink parameters comprise a pressure parameter, the pressure parameter being populated based on the line thickness between each two points along the analog stroke.

13. The system of claim 11, wherein the at least two ink parameters comprise a direction parameter, the direction parameter being populated based on the line thickness between each two points along the analog stroke.

14. One or more computer-readable storage media having instructions stored thereon that, when executed by a hardware processor of a processing system, direct the processing system to at least:

receive a static image of written content captured by a camera;

extract, from the static image, analog strokes of the written content from background information of the static image and marks that are not part of the written content of the static image;

analyze the analog strokes to identify at least two ink parameters associated with an underlying analog stroke of the written content;

convert the analog strokes to an ink modifiable format of digital ink strokes comprising the at least two ink parameters;

store the digital ink strokes;

display the digital ink strokes separate from the background information of the static image and the marks that are not part of the written content of the static image;

receive a modification to at least one of the digital ink strokes; and display the digital ink strokes with the modification to the at least one of the digital ink strokes.

15. The media of claim 14, wherein the written content comprises written drawings or written characters, the written characters including letters, numbers, symbols, punctuation, or a combination thereof.

16. The media of claim 14, wherein the instructions to convert the analog strokes to the ink modifiable format of digital ink strokes direct the processing system to: populate an ink container with the at least two ink parameters, wherein the at least two ink parameters are selected from a set of parameters consisting of a pressure, a direction, a beginning point, an end point, a color, an order, an overlap, a language, and a time.

17. The media of claim 14, wherein the instructions to analyze-the analog strokes direct the processing system to: determine a line thickness between two points along an analog stroke extracted from the static image to determine a pressure parameter.

18. The media of claim 14, wherein the instructions to analyze-the analog strokes direct the processing system to: determine a line thickness between two points along an analog stroke extracted from the static image to determine a direction parameter.

19. The media of claim 14, wherein the instructions further direct the processing system to:

perform ink analysis on the digital ink strokes to identify at least one word.

* * * * *